No. 720,383. PATENTED FEB. 10, 1903.
J. B. SCHUMAN.
SHOCK LOADER.
APPLICATION FILED MAR. 22, 1902.
NO MODEL. 2 SHEETS—SHEET 1.
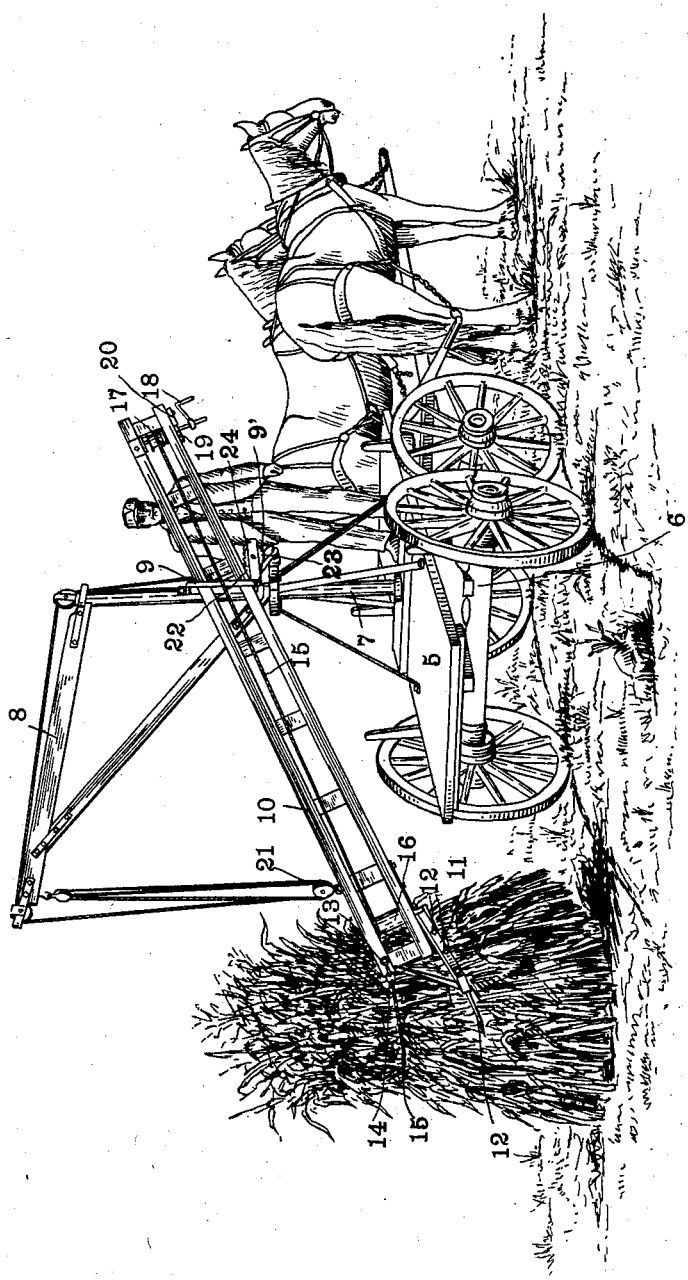
WITNESSES:
Chas N Leonard
Frank A Fahle
INVENTOR
James B. Schuman
BY
Bradford Hood
ATTORNEYs No. 720,383. PATENTED FEB. 10, 1903.
J. B. SCHUMAN.
SHOCK LOADER.
APPLICATION FILED MAR. 22, 1902.
NO MODEL. 2 SHEETS—SHEET 2.
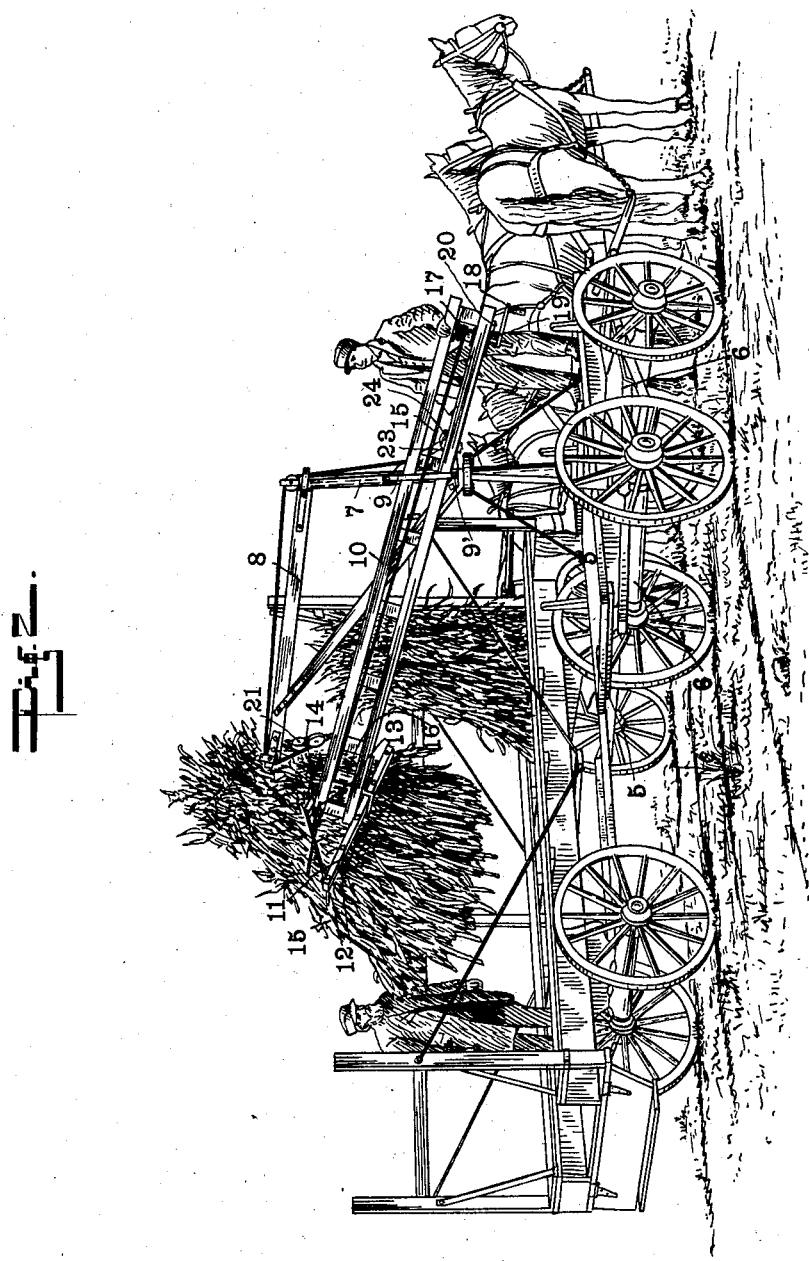
WITNESSES:
Chas N. Leonard,
Frank A. Fahle
INVENTOR
James B. Schuman
BY
Bradford Hood
ATTORNEYs

UNITED STATES PATENT OFFICE.

JAMES B. SCHUMAN, OF COLUMBIA CITY, INDIANA, ASSIGNOR OF ONE-HALF TO JOSEPH K. SHARPE, JR., OF INDIANAPOLIS, INDIANA.

SHOCK-LOADER.

SPECIFICATION forming part of Letters Patent No. 720,383, dated February 10, 1903.

Application filed March 22, 1902. Serial No. 99,408. (No model.)

*To all whom it may concern:*

Be it known that I, JAMES B. SCHUMAN, a citizen of the United States, residing at Columbia City, in the county of Whitley and State of Indiana, have invented certain new and useful Improvements in Shock-Loaders, of which the following is a specification.

The object of my invention is to provide simple and efficient means for lifting shocks of corn or other crops from the ground and placing the same intact upon a wagon, which means may be placed upon any one of the usual running-gears usually found on a farm.

The accompanying drawings illustrate my invention.

Figure 1 is a perspective view of my device with the parts in position ready to lift a shock from the ground. Fig. 2 is a similar view with the shock about to be placed upon a wagon.

In the drawings, 5 indicates a supporting-platform which is adapted to be placed upon the running-gear 6 of a wagon or may be placed upon any suitable transporting means or, if desired, directly upon the ground. Located upon platform 5 is a crane or derrick consisting of a mast or standard 7, carrying at its upper end a cross-arm 8, suitably braced, the mast being revoluble about a vertical axis. Supported in a suitable vertical strap 9, carried by mast 7, is a beam 10, which beam is fulcrumed on a pin 9', carried at the lower end of strap 9. Secured to the forward end of beam 10 is a cross-arm 11, suitably braced from the beam and carrying a plurality of teeth 12. The forward end of beam 10 carries a hook 13, which is adapted to receive an eye 14, carried by the end of a rope 15. Rope 15 is passed around a vertical roller 16, carried by the forward end of beam 10, and from thence passes to a windlass 17, carried by the rear end of beam 10 and provided with an operating-handle 18 and a ratchet 19, said ratchet being engaged by a pawl 20, carried by the beam.

Secured to the forward end of beam 10 is a suitable lifting-tackle 21, the rope of which passes up over suitable pulleys carried by arm 8 and mast 7 and extends to a windlass 22, carried by mast 7 and provided with a ratchet-wheel 23 and pawl 24.

In operation platform 5 is brought adjacent a shock of corn or other crop, and pawl 24 withdrawn, so as to allow the rope of tackle 21 to unwind from windlass 22 and lower the forward end of beam 10 toward the ground. The operator then shoves beam 10 through strap 9, over fulcrum 9', and thrusts teeth 12 of bar 11 into the shock. The end of rope 15 is then drawn forward, passed around the shock, and its eye 14 passed over hook 13, whereupon the operator winds rope 15 upon the windlass 17, so as to securely tie the shock to the forward end of beam 10. The forward end of beam 10, together with the shock, may then be lifted by the use of tackle 21, and as soon as a sufficient height from the ground has been reached the entire mechanism may be swung upon mast 7 as a pivot and the shock deposited on a wagon, as shown in Fig. 2.

I claim as my invention—

1. A shock-loader consisting of a suitable carrying-platform, a mast revolubly mounted thereon and provided with a cross-arm, a beam, means carried by the end of the beam for embracing a shock and holding the same substantially vertical, lifting-tackle supported by the cross-arm and engaging the beam near its outer end, and a support carried by the mast to receive the inner end of the beam to allow both vertical and longitudinal reciprocation of the outer end of the beam.

2. A shock-loader consisting of a suitable carrying-platform, a derrick-mast revolubly mounted thereon, a beam 10 supported in a vertical strap carried by the mast so as to swing in a substantially vertical plane and movable longitudinally through the strap, lifting-tackle carried by the derrick and engaging the forward end of the beam, teeth carried by the forward end of the beam, the rope 15 detachably secured to the beam at one end and adapted to be passed around a shock and from thence to a windlass carried by the beam, and the said windlass, substantially as shown and described.

In witness whereof I have hereunto set my hand and seal, at Indianapolis, Indiana, this 13th day of March, A. D. 1902.

JAMES B. SCHUMAN. [L. S.]

Witnesses:
ARTHUR M. HOOD,
JAMES NELLER.